United States Patent [19]

Sick

[11] Patent Number: 5,071,022
[45] Date of Patent: Dec. 10, 1991

[54] CLOSURE COVER

[75] Inventor: Hans-Hermann Sick, Kaiserslautern, Fed. Rep. of Germany

[73] Assignee: TRW United Carr GMBH & Co., Enbach-Alsenborn, Fed. Rep. of Germany

[21] Appl. No.: 524,215

[22] Filed: May 15, 1990

[30] Foreign Application Priority Data

May 29, 1989 [DE] Fed. Rep. of Germany ....... 3917407

[51] Int. Cl.$^5$ .............................................. B65D 41/00
[52] U.S. Cl. .................................................... 220/307
[58] Field of Search .................. 52/716; 220/307, 308, 220/359

[56] References Cited

U.S. PATENT DOCUMENTS

| | | | |
|---|---|---|---|
| 3,851,794 | 12/1974 | Hehl | 220/308 |
| 4,290,536 | 9/1981 | Morel | 220/359 |
| 4,347,693 | 9/1982 | Kruschwitz | 52/716 |
| 4,413,033 | 11/1983 | Weichman | 52/716 |
| 4,646,932 | 3/1987 | Masler | 220/307 |
| 4,801,040 | 1/1989 | Kraus | 220/307 |
| 4,935,269 | 6/1990 | Fischer | 52/716 |
| 4,938,378 | 7/1990 | Kraus | 220/307 |

Primary Examiner—John E. Murtagh
Attorney, Agent, or Firm—Fay, Sharpe, Beall, Fagan, Minnich & McKee

[57] ABSTRACT

The invention relates to a plastic closure cover especially suited for the closing of an opening in a motor vehicle body panel. The closure cover comprises a bottom wall 2, which is joined with a circumferentially extending elastically deformable flange 3 arranged to overlap the edge of the upper side of the panel opening. A catch ring 4 is formed on the bottom part 2 and extends diagonally outward and upward to press against the lower side of the opening. According to the invention, there is arranged, in each case, on the end of the flange 3 and of the catch ring 4, a flexible sealing lip 5, 6 for pressing against the edge zone of the opening.

3 Claims, 1 Drawing Sheet

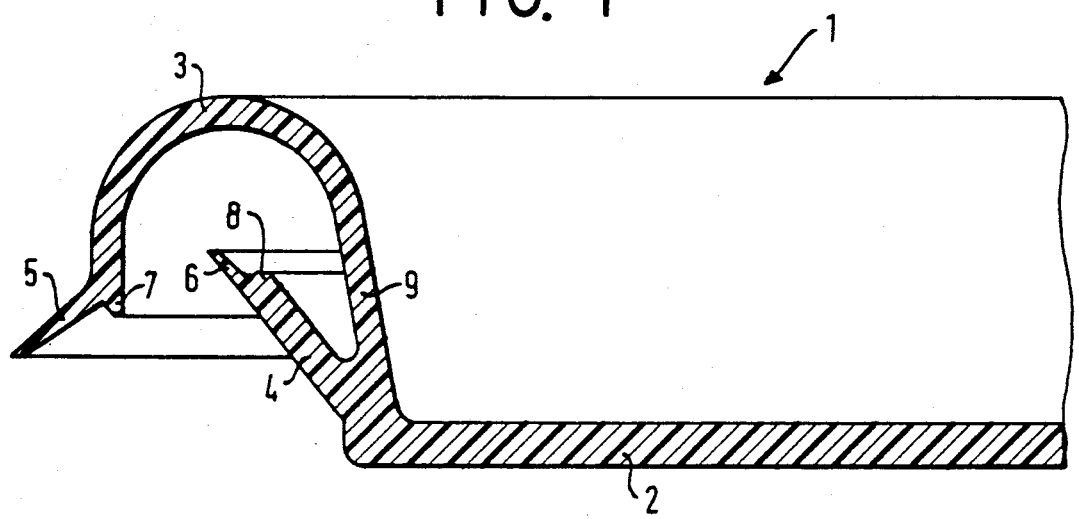
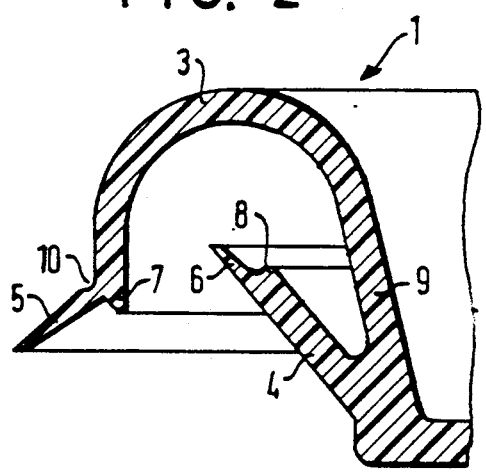 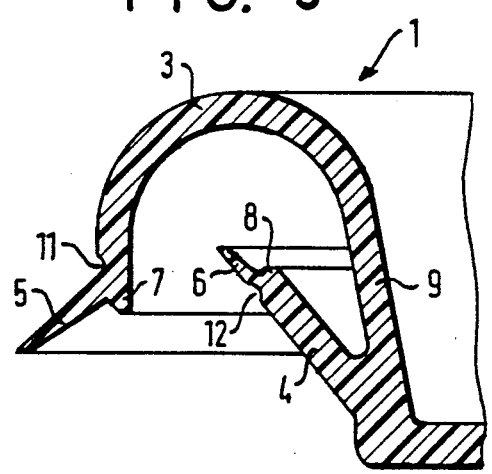

CLOSURE COVER

BACKGROUND OF THE INVENTION

The invention relates to a plastic closure cover especially for closing an opening in a motor vehicle body panel. The closure cover includes a bottom wall, which is joined to an elastically deformable flange arranged for overlapping the edge of the upper side of the opening. A catch ring running diagonally outward and upward is also formed on the bottom part for overlapping the lower side of the opening.

Already known as state of the art is a closure cover which is used, in particular, for the sealing of paint run-out holes in bodies of motor vehicles, (German Printed Disclosure 3,512,582). With this prior closure cover, the disadvantage may occur that the upper side or lower side of the body panel in the zone of the opening is not flat, so that the sealing effect of the flange or the catch ring is not sufficient. Another parameter of attaining a perfect sealing of the paint run-out holes, consists of the choice of plastic material of the closure cover.

Other known closure covers used to produce sealing use an intermediate element which is expensive. (See, for example, British Patent 1,354,973 and German Printed Disclosure 3,011,448).

On the other hand, the present invention attacks the problem of designing a closure cover of the kind mentioned, so that an improved sealing results in both the flange zone and in the catch ring zone.

BRIEF STATEMENT OF THE INVENTION

This problem is solved according to the invention by the fact that in each case, on the end of the flange and on the end of the catch ring, there is arranged a flexible and resilient sealing lip for overlapping the edge zone of the opening. In this way, the advantage is given that, both in the micro zone (surface roughness) and in the macro zone (surface unevenness or waviness), there is obtained, according to the invention, a good hugging of the edge zone of the closure cover against the surface of the body part.

To attain high pressing-out or engaging forces for such a closure cover, the use of rigid or hard materials is necessary. This can be obtained by the use of cut fiber reinforcement, for example, glass fibers. But here, as a disadvantage, lips formed of such a hard or stiff material have limited flexibility and produce insufficient sealing effect. Therefore, in a further development of the invention, the sealing lips opposite the material thickness of the flange and of the catch ring are designed so thin-walled that during injection molding they can only be filled by the easy-flowing base polymer, but not by the glass fibers.

The holding back of the glass fibers from flowing into the sealing lips, can be attained, for example, by at least one damming zone in the filling direction of the particular sealing lip. This may be attained, for example, by the use of circular grooves which create narrow passages through which the glass fibers do not readily flow. Also, in this way, the special hugging effect of the thin-walled sealing lips is increased, since with the use of material reinforced with fiber glass, no glass fibers get into the lip zone. Thus, a more rigid cover with extremely flexible sealing lips results.

In further development of the invention, there may be provided in each case, at the transition of the sealing lips into the flange or into the catch ring, a stop zone formed on the flange or sealing ring. With this, sufficient resiliency is provided, so that even under full pressure the lip has the possibility of performing its full sealing effect. In placing these stop elements, a sealing-off effect is also attained. Advantageously, a double sealing effect is attained, namely through the sealing lip, on the one hand, and through the stopping zone, on the other.

In a closing cover in which the bottom part is arranged lower and adjoins a shoulder passing through the opening, according to the invention, a flange formed on the shoulder may be provided on the end with a thin-walled sealing lip.

BRIEF DESCRIPTION OF THE DRAWINGS

The invention will be described in detail below from embodiments represented in the drawing wherein:

FIG. 1 is a cross-sectional view through the periphery of a closure cover formed in accordance with the invention; and FIGS. 2 and 3 are views like FIG. 1 but showing different embodiments of the closure cover partly broken away.

DETAILED DESCRIPTION OF THE PREFERRED EMBODIMENT

According to FIG. 1, the closure cover 1 is comprised, generally, of a bottom wall part 2, on which is formed a circumferentially continuous upwardly extending shoulder 9 which is sized to substantially fill the panel opening intended to be closed by the closure cover. The shoulder 9 passes into or connects with an integral, laterally extending flange 3, which may be made elastically deformable.

In the lower zone of the cover adjacent the juncture of bottom part 2 and shoulder 9 is a catch ring 4 which runs diagonally outward and upward.

In each case, there is arranged on the end of the flange 3 and on the end of the catch ring 4, a resilient sealing lip 5 and 6, respectively. The lips 5 and 6 are arranged for striking against the edge zone of the opening in the panel, not shown in detail. Here, the sealing lips 5 and 6 are much thinner and more resilient as compared with the material thickness of the flange 3 and the catch ring 4.

If the closure cover is comprised of a plastic or resinous material reinforced with fiber glass, care must be taken that the sealing lips 5 and 6 remain free of fiber glass so that their resiliency and full sealing effect may be retained. In this manner, there results a more rigid closing cover 1, with extremely flexible sealing lips 5 and 6. On the one hand, lip 5 strikes elastically against the upper side of the opening of the panel (not shown in detail), and on the other hand, lip 6 strikes elastically against the under side of the opening of the said panel.

For further improvement of the sealing effect, there are provided, in each case, at the transition of the sealing lips 5 or 6 into the flange 3 and into the catch ring 4, respectively, a stop zone, formed on the flange 3 or the sealing ring 4. With this, the end is gained that even with maximum pressing pressure by the flange 3, for example, as results with maximum panel thickness, the sealing lips 5 or 6 never come to lie completely flat against the particular surface of the body metal. Thus, the sealing lips 5 and 6 always have sufficient deforming reserves to hug closely and conform to any waviness in the surface of the metal panel construction to be sealed. Naturally, also with the pressure of the damming zones 7 and 8, the sealing effect is doubled.

The embodiments illustrated in the drawing show a closing cover in which the bottom wall part is arranged at a lower position with this bottom wall part 2 joining with a shoulder 9 that passes through the opening of a panel, not shown in detail. There is also the alternative possibility, not shown in detail, that the bottom part 2 (with elimination of the shoulder 9) may lie directly in alignment with the flange 3. With this embodiment also, the flange 3 has on its end the thin-walled lip 5 and the damming zone 7. Likewise, the diagonally projecting catch ring 4 has the sealing lip 6 with the damming zone 8.

According to the invention, the closure cover may as an alternative be comprised of polyester elastomer, in which case, the extremely thin walled sealing lips 5 and 6 have high tensile strength and stretch.

According to FIG. 2, it is possible in a closing cover of hard or stiff material (by the use of cut fiber glass reinforcement, for example), to arrange a damming zone 10 in the filling direction before the sealing lip 5. In this way, the sealing lip 5 is filled only from the easy-flowing basic polymer, but not from the glass fibers. In this way, a very good elasticity of the sealing lip 5 is retained.

As an alternative, according to FIG. 3, it is possible to provide both sealing lips 5 and 6 with such a damming zone 11 and 12, so that a very high elasticity of the two sealing rings 5 and 6 is attained.

Through the corresponding damming zones, 10 or 11 and 12, there is obtained, to advantage, a holding back of the glass fibers from flowing into the sealing lips.

By the use of these sealing lips 5 and 6 and the stop zones 7 and 8 cooperating with them, a greatly improved sealing effect of an opening, especially in a motor vehicle body is obtained, and, indeed, both in the micro and the macro range.

Having thus described the invention, it is now claimed:

1. In a closure cover formed of plastic, especially suited for the closing of an opening in a panel and comprised of a bottom wall part which is joined with an elastically deformable circumferential continuous shoulder carrying a flange positioned for overlapping the edge of the upper side of the panel opening, and with a catch ring formed on the bottom wall part and extending diagonally outward and arranged for striking against the panel about the under side of the opening the improvement wherein a respective resilient sealing lip (5; 6) is arranged on the end of the flange (3) and of the catch ring (4) for striking against the opposite sides of the panel about the opening, each said resilient sealing lip having a wall thickness which is significantly less than the respective flange and catch ring on which it is located, and said bottom wall part and said flange and catch ring being formed from a resinous material filled with reinforcing fibers and said sealing lips being formed from the same resinous material integrally with the respective flange and catch ring on which it is mounted but not filled with reinforcing fibers so that the sealing lips are significantly more flexible than said flange and catch ring.

2. A closure cover according to claim 1 wherein, at the transition of the sealing lips (5; 6) into the flange (3) and into the catch ring (4), an outwardly extending stop zone (7; 8) is formed on the flange (3) and on the catch ring (4).

3. A closure cover according to claim 2 wherein the cover has a reduced thickness damming zone (10; 11; 12) is arranged at the juncture of the sealing lips (5; 6) with the respective flange and stop ring.

* * * * *